(12) United States Patent
Weiler et al.

(10) Patent No.: US 7,849,553 B2
(45) Date of Patent: Dec. 14, 2010

(54) WIPER DEVICE

(75) Inventors: Michael Weiler, Chungchongbuk-Do (KR); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 1273 days.

(21) Appl. No.: 10/564,736

(22) PCT Filed: May 26, 2004

(86) PCT No.: PCT/DE2004/001079

§ 371 (c)(1),
(2), (4) Date: Jan. 19, 2006

(87) PCT Pub. No.: WO2005/009810

PCT Pub. Date: Feb. 3, 2005

(65) Prior Publication Data

US 2006/0162115 A1    Jul. 27, 2006

(30) Foreign Application Priority Data

Jul. 22, 2003   (DE) ................................ 103 33 188

(51) Int. Cl.
*B60S 1/34* (2006.01)
(52) U.S. Cl. .............................. 15/250.351; 15/250.352
(58) Field of Classification Search ............ 15/250.351, 15/250.352, 250.34, 250.23, 250.21, 250.19
See application file for complete search history.

(56) References Cited

U.S. PATENT DOCUMENTS 2,230,596 A * 2/1941 Horton ..................... 15/250.19
3,623,183 A * 11/1971 Wilfert et al. .......... 15/250.351
4,864,678 A    9/1989 Stevens
6,813,802 B2   11/2004 Buchanan, Jr.

FOREIGN PATENT DOCUMENTS

| DE | 31 42 716 | 5/1983 |
| DE | 100 52 616 | 5/2002 |
| EP | 0 299 708 | 1/1989 |
| WO | 02/34588 A1 | 5/2002 |
| WO | WO 2004/002788 | 1/2004 |

* cited by examiner

*Primary Examiner*—Gary K Graham
(74) *Attorney, Agent, or Firm*—Michael Best & Friedrich LLP (57) ABSTRACT

The invention concerns a wiper device, in particular for a motor vehicle, comprising a wiper arm (10*a*-10*c,* 10*k,* 10*l*) including a wiper rod (12*a,* 12*c,* 12*k*) for fixing a wiper blade, a fixing element (14*a*-14*c,* 14*k,* 14*l*) connected free of articulation to the wiper rod (12*a,* 12*c,* 12*k*) and at least one partial zone (16*a*-16*m*) having spring elasticity. It is proposed that the wiper arm (10*a*-10*c,* 10*k,* 10*l*) can shift essentially elastically from an operating configuration to at least one first stable configuration, wherein the wiper blade can be mounted and dismounted when the wiper arm (10*a*-10*c,* 10*k,* 10*l*) is in a mounted state.

10 Claims, 14 Drawing Sheets

WIPER DEVICE

BACKGROUND OF THE INVENTION

The invention concerns a wiper device.

A wiper device forming the species is known from DE 31 42 716 C2. The wiper device includes a wiper arm with a wiper rod manufactured of a spring elastic plastic, on whose free end a wiper blade can be fastened, as well as a fixing element, with which the wiper rod is connected free of articulation. The wiper rod features a constant profile having a plastic core and a plastic jacket surrounding the plastic core over its length.

SUMMARY OF THE INVENTION

The invention concerns a wiper device, in particular for a motor vehicle, comprising a wiper arm including a wiper rod for fixing a wiper blade, a fixing element connected free of articulation to the wiper rod and at least one partial zone having spring elasticity.

It is proposed that the wiper arm can shift essentially elastically from an operating configuration to at least one first stable configuration, wherein the wiper blade can be mounted and dismounted when the wiper arm is in a mounted state, whereby dismounting the wiper arm for the purpose of replacing the wiper blade is advantageously avoided and a comfortable, essentially wear-free folding out of the wiper arm, in particular to replace the wiper blade and for purposes of cleaning the vehicle window, can be enabled.

In this connection "free of articulation" means that the wiper rod and the fixing element are connected without a materially designed swivel axis around which the wiper rod and the fixing element could swivel relative to one another. Components, which due to a material deformation, in particular due to an elastic deformation, enable a relative movement between the wiper rod or partial zones of the wiper rod and the fixing element, should not be viewed in this connection as articulation and in particular should also be included in the extent of the protection, i.e., film hinges, spring elastic partial pieces, spring elastic wiper rods, etc., for example.

The wiper arm can be designed as one piece or as multiple pieces, whereby at least a two-piece design with a fixing element separated from the wiper rod can be advantageous because of the different requirements for the material properties. In particular a configuration in which the wiper arm remains without the essential holding force of a user should be understood in this connection as a stable configuration. In particular, a configuration in which the mounted wiper arm exerts a bearing force on the to-be-wiped surface via the wiper blade should be understood as an operating configuration. Moreover, a process essentially characterized by elastic deformations and by preservation of the material properties should be understood as essentially a spring elastic shift. In this connection, however, the shifting process can also include the opening of a fixation and/or plastic deformations of individual components that are used for dampening the fold-out movement, for example.

In one embodiment of the invention it is proposed that the wiper arm in a demounted state features a second stable configuration varying from the first stable configuration, into which the wiper arm can essentially be shifted in a spring elastic manner. A stable delivery position can be advantageously provided by means of the second stable configuration along with the first stable configuration that is useable as the mounting position. In addition, if the operating configuration is included in the quantity of configurations occurring when shifting the wiper arm from the first to the second stable configuration, a force acting in the direction of the second stable configuration and thus in the direction of the to-be-wiped surface can be achieved in the operating configuration.

In a further embodiment of the invention it is proposed that the spring elastic partial zone features at least one curved formation whose convex side points in a first direction in the first stable configuration and in the second stable configuration points in a second direction, in particular a direction essentially opposing the first direction. Upending the curved local formation can produce, in terms of the equilibrium, a great change in the shape of the wiper arm so that the local formation can assume a switch function for the shape of the overall wiper arm. In this case, the wiper arm can feature one or more independent and/or connected-in-series and/or connected-in-parallel formations of this type. Particularly suitable are spherical-cap-shaped or oval (in a top view) formations, by means of which a bistable component with a spring elastic partial zone can be realized in a simple way. In addition, a high flexural strength, at least in the wiper movement direction, can be guaranteed.

If the spring elastic partial zone features at least one hole in the area of the curved formation, it is possible to advantageously achieve that during the shifting movement between a stable configuration and the operating configuration or another stable configuration where only small elastic deformations of the material occur, whereby material fatigue can be advantageously prevented. The size and the shape of the hole can be advantageously selected to determine the forces acting during the shifting movement.

An additional realization of a bistable wiper arm can be achieved by the spring elastic partial zone featuring at least one arched section, which in the first stable configuration has a curvature in a first direction and in the second stable configuration a curvature in a second direction, whereby a bistable component can be manufactured in a cost effective manner, which can be advantageously integrated into the longish shape of the wiper arm.

In addition, it is proposed that at least one section of the spring elastic partial zone be under initial tension in at least one stable configuration. The initial tension represents a parameter, which can be advantageously used to set the force to be used for the shifting movement. In the configuration, having initial tension the section can be fixed with positive engagement, frictional engagement or a substance-to-substance bond.

In addition, a comfortable shifting of the configurations into each other can be advantageously achieved if the wiper device has at least one limit stop in the area of the spring elastic partial zone, via which limit stop a force can be initiated in a targeted manner in the area of the spring elastic partial zone during a shifting process between the stable configurations. The force can be initiated, in this case, via the limit stop directly in the spring elastic partial zone or via a limit stop arranged outside of the spring elastic partial zone and via an arm of a lever. A force exerted on the wiper arm can be concentrated advantageously on an active section of the spring elastic partial zone, in particular, directly on a spherical-cap-shaped formation or on an initially tensioned arc and strong deformations leading to material fatigue can be excluded. In addition, a transition point can be advantageously set by the limit stop during a shifting movement between two configurations. The transition point separates two phases during the shifting movement, in which a restoring force drives the wiper arm in the direction of different configurations.

If the limit stop is formed on the fixing element and/or if the spring elastic partial zone is integrated into the wiper rod as one piece, the number of components of the wiper arm and the assembly expense can be advantageously reduced. Other embodiments where the limit stop represents an independent component or is formed on components of the motor vehicle other than fixing element are also conceivable. In this case, a one-piece design of the spring elastic partial zone with the fixing element is also conceivable.

A cost effective product can be achieved if the spring elastic partial zone is designed as a punched bent sheet metal part.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
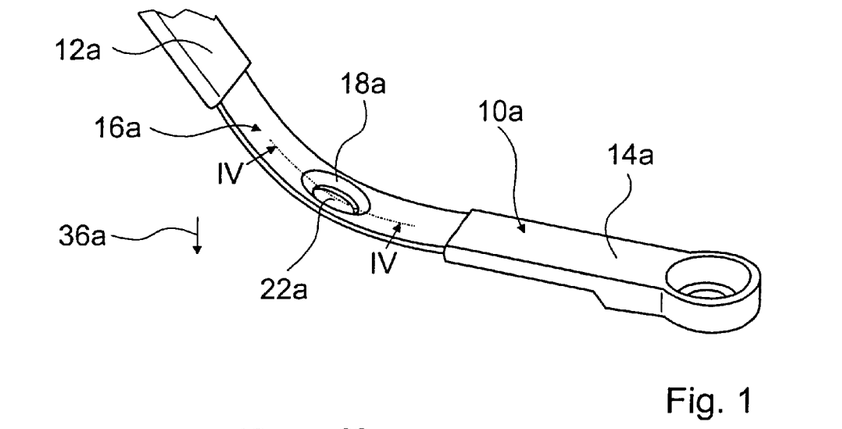
FIGS. 1-3 A section of a wiper arm with a spring elastic partial zone in a first stable configuration, in a working configuration and in a second stable configuration FIGS. 4 and 5 A longitudinal section through a partial zone of the wiper arm from FIGS. 1 and 3
Figure 4:
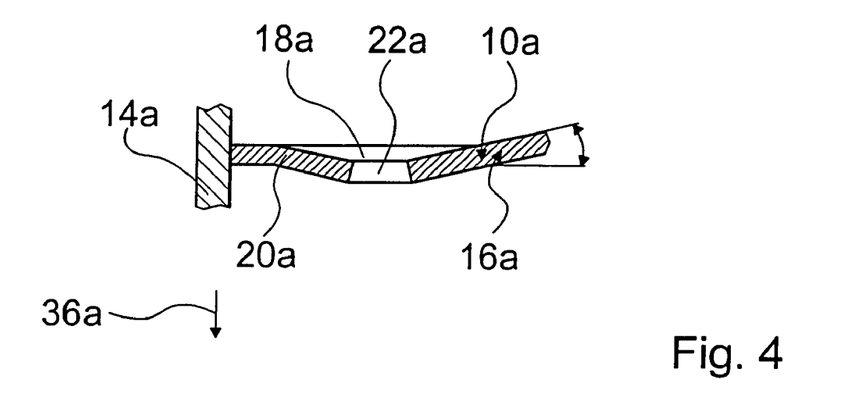

FIG. 1 depicts a section of a wiper arm 10a of a wiper device of a motor vehicle. The section shows a fixing element 14a, a spring elastic partial zone 16a and section of wiper rod 12a. All parts 12a, 14a, 16a are connected with one other free of articulation. The wiper arm 10a features a first stable configuration, in which mounting and dismounting a wiper blade (not shown) is possible when the wiper arm 10a is in a mounted state. In this case, the spring elastic partial zone 16a has a curved, spherical-cap-shaped formation 18a with a round hole 22a arranged in the center, whose convex side 20a points in the direction 36a of a vehicle window (not shown here) (FIGS. 1 and 4). A design of the formation without a hole (not shown here) is also possible.

Figure 2:
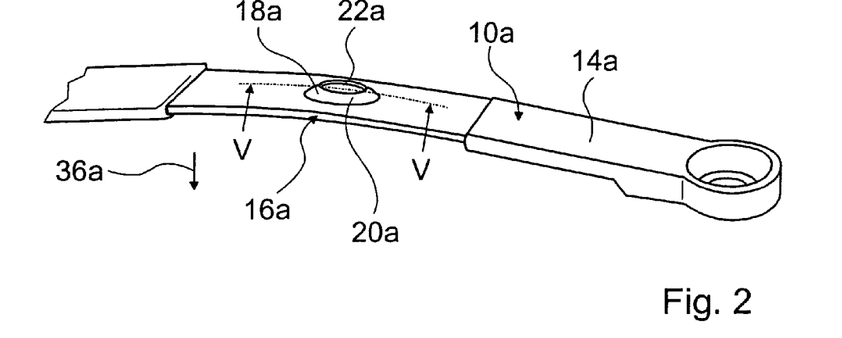
Figure 3:
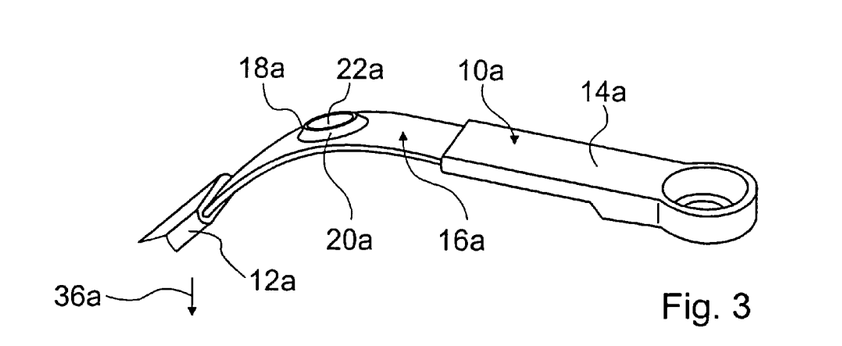
Figure 5:
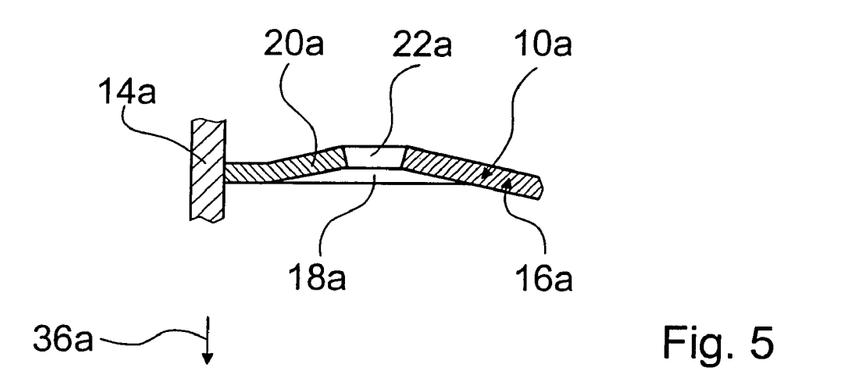
Figure 6:
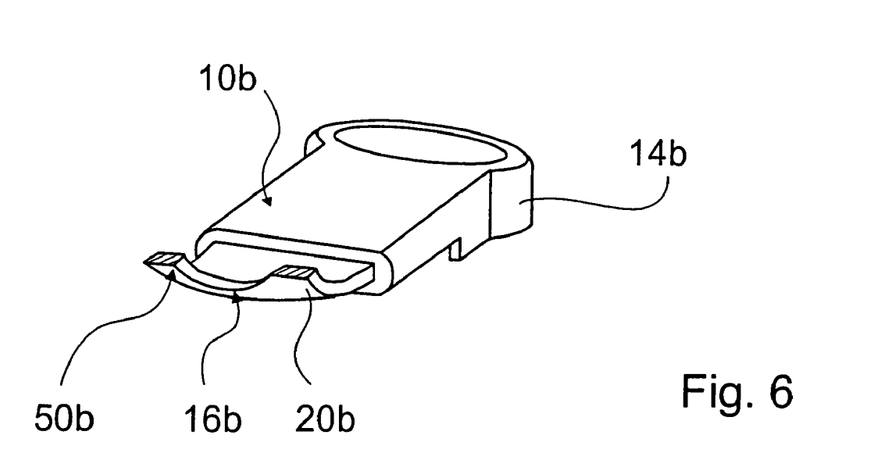
FIG. 6 A fixing element of an alternative wiper arm that is free of articulation, as well as a section of a bistable component of a wiper rod FIGS. 7-9 The bistable component of the wiper rod according to FIG. 6 in a form with a pre-impressed curvature, as well as in the raw form FIGS. 10 and 11 A bistable component for another alternative wiper arm in a raw form and in a form with an extended center section FIGS. 12-14 The wiper arm with the bistable component according to FIG. 10-11 in a first stable configuration, in a working configuration and in a second stable configuration FIGS. 15 and 16 An arched component and a frame in a loose and in a welded state for another alternative wiper arm FIGS. 17-20 Schematic representations for manufacturing a bistable component by initially tensioning individual sections in a front and side view FIGS. 21-32 Spring elastic components for additional alternative wiper arms in configurations with and without initial tension FIGS. 33-37 "Snapshots" of a process in which another alternative wiper arm with limit stops is shifted from an operating configuration to a first stable configuration and back FIG. 38 The wiper arm according to FIG. 33-37 in a mounted state shortly before a transition point FIGS. 39 and 40 A section of the wiper arm from FIGS. 33-38 in a spatial representation in two configurations FIGS. 41-43 A section of another alternative wiper arm in spatial representations in two configurations

FIG. 2 depicts the wiper arm 10a in an operating configuration and FIG. 3 shows a second stable configuration, in which the wiper arm 10a can be shifted to spring elastically out of the first stable configuration via the operating configuration. From the operating configuration in FIG. 2, a tension force of the spring elastic partial zone 16a drives the wiper arm 10a in the direction 36a of the second stable configuration (FIG. 3). When the wiper arm 10a is in a mounted state the tension force in the operating configuration generates a bearing force of the wiper blade on the vehicle window. In the operating configuration and in the second stable configuration, the convex side 20a of the curved formation 18a points in a direction opposing the direction 36a of the vehicle window (FIGS. 2 and 5).

Figure 7:
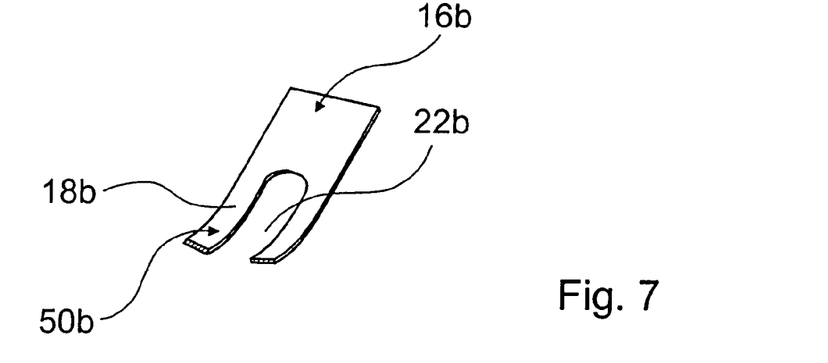
Figure 8:
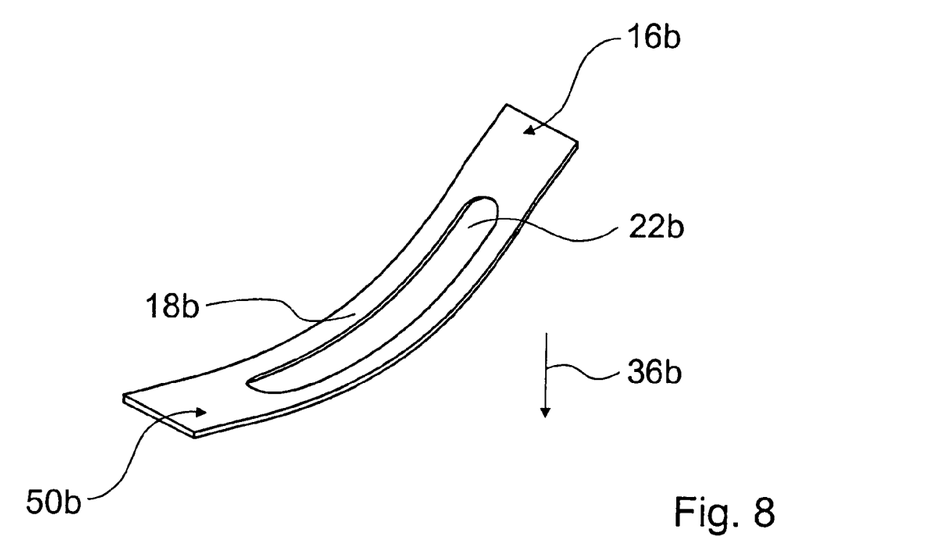
Figure 9:
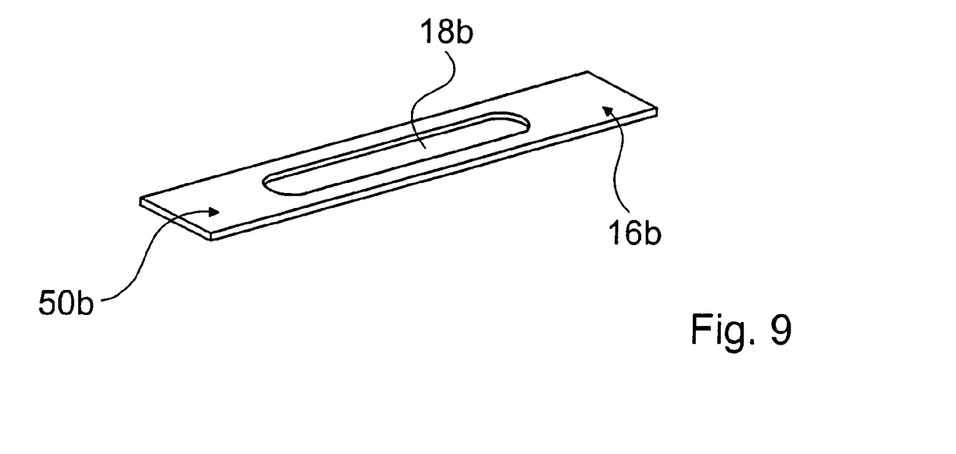

FIGS. 6-9 depict a fixing element 14b, as well as a bistable component 50b of an alternative wiper arm 10b that is free of articulation. A separate component 50b (FIG. 9), that is flat in a raw state, is fastened to the fixing element 14b as a spring elastic partial zone 16b. The component 50b has a curved formation 18b in a state that is depicted in FIGS. 7 and 8. In the area of the curved formation 18b, an elongated hole 22b arranged in the center transverse to the longitudinal direction and extending in the longitudinal direction of the component 50b has been removed. Under the effect of force, the formation 18b can be upended in a direction opposing an original direction 36b (FIG. 8), whereby the wiper arm 10b switches between two stable configurations.

Figure 10:
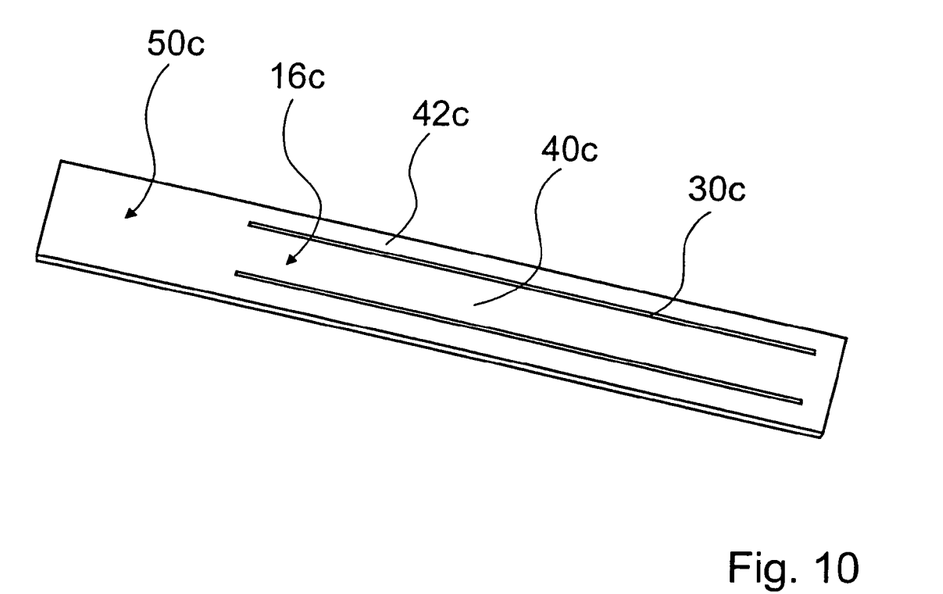
Figure 11:
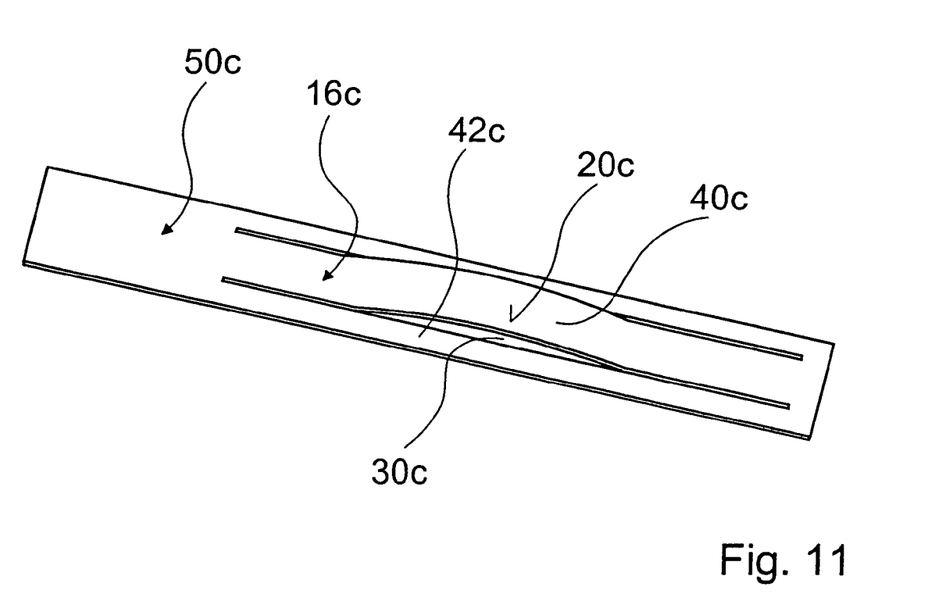
Figure 12:
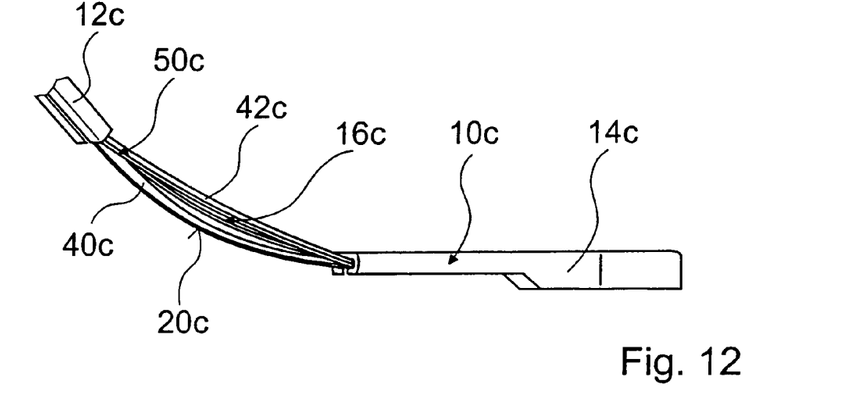
Figure 13:
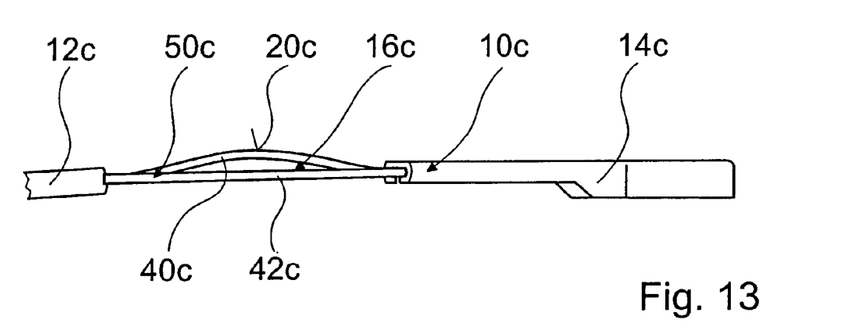
Figure 14:
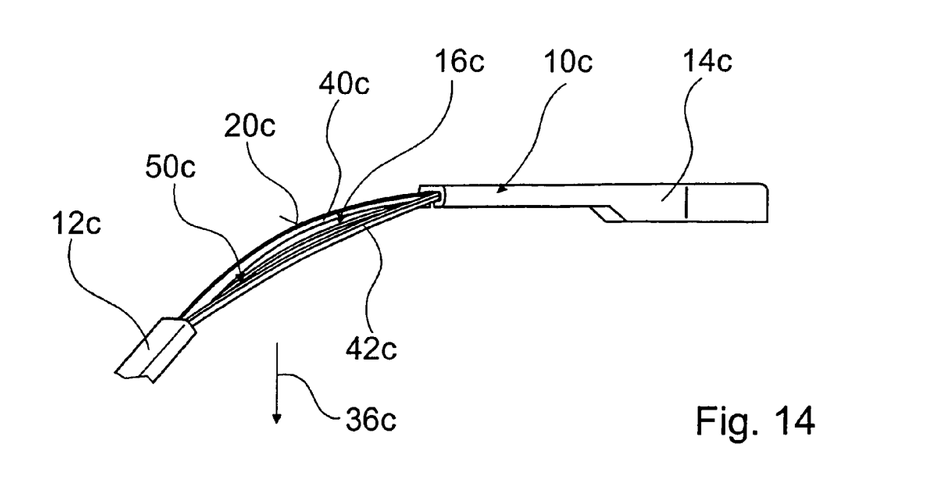

A bistable component 50c for another alternative wiper arm 10c is depicted in FIGS. 10 and 11. The component 50c that is flat in a raw state (FIG. 10) has two parallel longitudinal sections 30c, which subdivide the component 50c into a center section 40c and two outer sections 42c. To manufacture the bistable component 50c, the center section 40c is stretched by plastic deformation of the material into an arc shape (FIG. 11), whose convex side 20c in a first stable configuration of the wiper arm 10c (depicted in FIG. 12) points in a first direction 36c facing a vehicle window and in a operating configuration depicted in FIG. 13 and a second stable configuration depicted in FIG. 14 points in a second direction opposing the first direction 36c.

Figure 15:
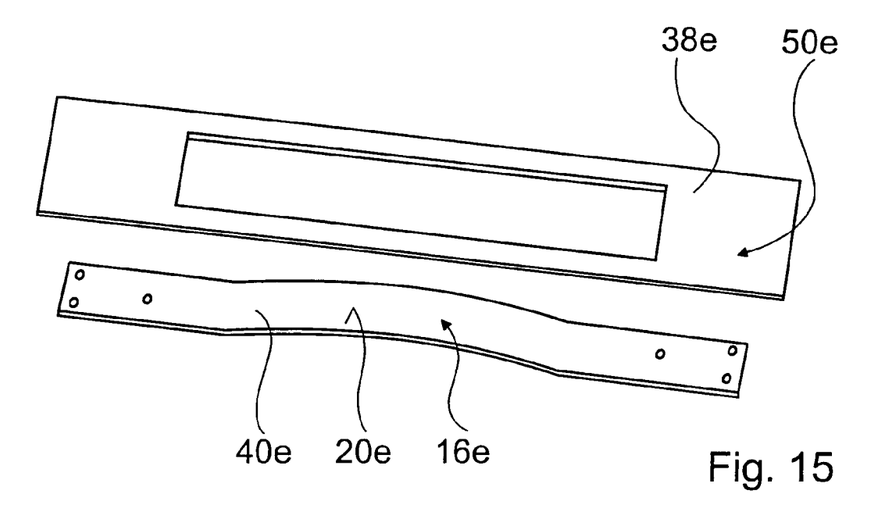
Figure 16:
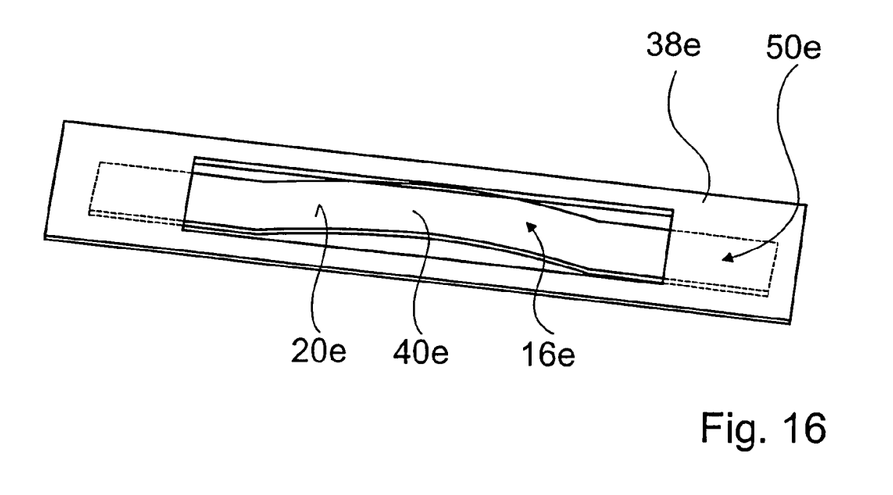

In a further alternative wiper arm, a bistable component 50e, which is depicted in FIGS. 15 and 16, is comprised of a frame 38e and a center section 40e stretched into an arc. The parts 50e, 40e are depicted loose in FIG. 23 and welded in FIG. 24.

Figure 17:
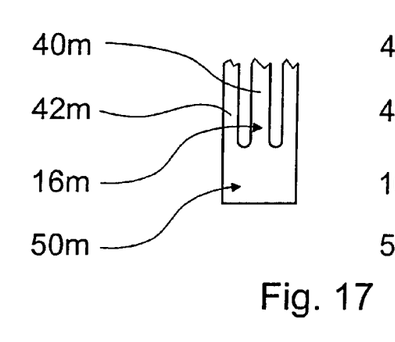
Figure 18:
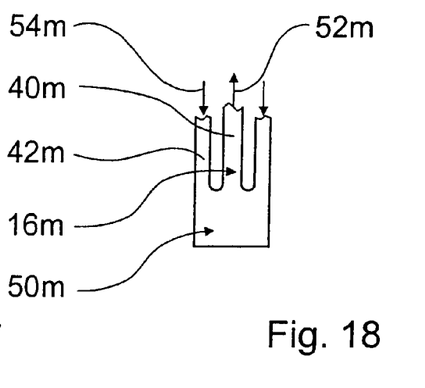
Figure 19:
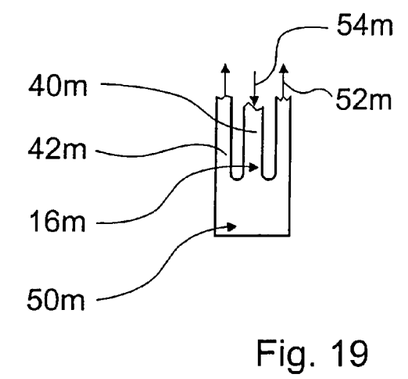
Figure 20:
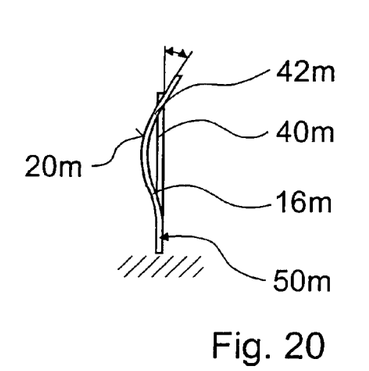

FIGS. 17-20 provide schematic representations of how a bistable component 50m can be manufactured by initially tensioning at least one section of a flat component 50m with three longish sections 40m, 42m, as depicted schematically in FIG. 17. In FIG. 18, a tensile force 52m acts on the center section 40m and a compressive force 54m acts on the outer sections 42m. The outer sections 42m are initially tensioned elastically into arcs, as shown in FIG. 20 in a side view of the component 50m from FIG. 18. FIG. 19 shows that a compressive force 54m on the center section 40m and a tensile force 52m on the outer sections 42m produce an arched curvature of the center section 40m.

Several exemplary embodiments of spring elastic components 50d, 50d-50j in accordance with the principle depicted in FIGS. 17-20 are depicted in FIGS. 21-32. In this case, high flexural strength in the wiper movement direction is achieved in the exemplary embodiment depicted in FIGS. 21 and 22 due to a transverse connection 56d between the two outer sections 42d. In the configuration depicted in FIG. 22 a compressive force 54d acts on the transverse connection 56d in the direction of the longitudinal extension of the component 50d. The compressive force 54d is distributed to the two outer sections 42d, which are initially stressed in an arched manner. In this configuration, the component 50d can be fixed in the area of the transverse connection 56d during installation in a wiper arm, whereby the internal tension force built up in the sections 42d is supported on section 40d.

Figure 23:
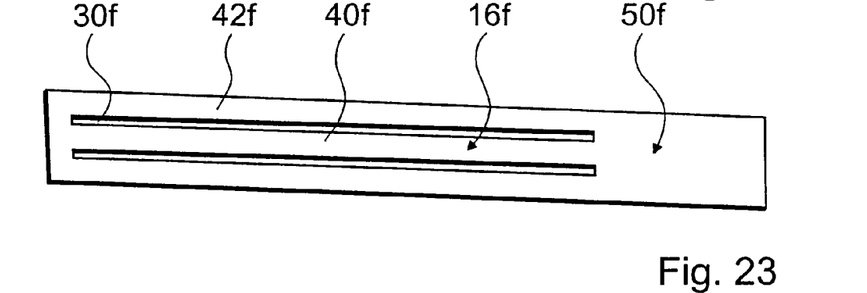
Figure 24:
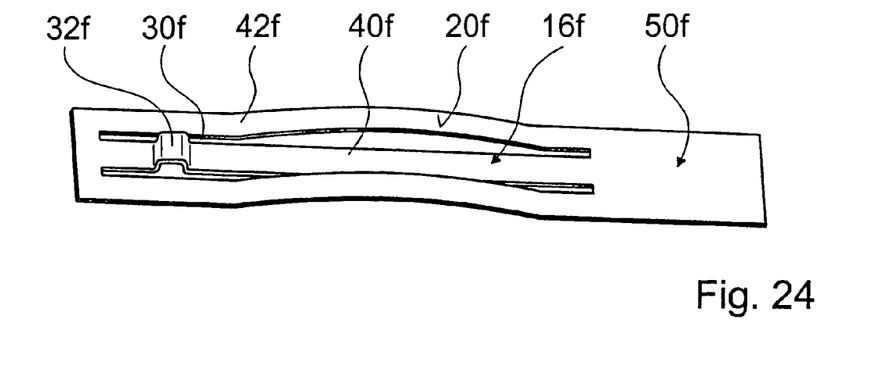
Figure 25:
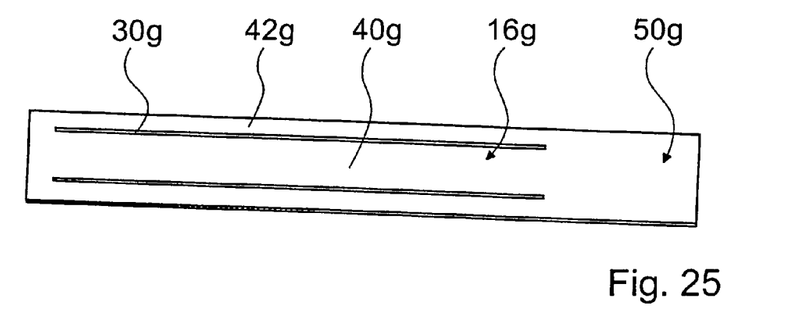
Figure 26:
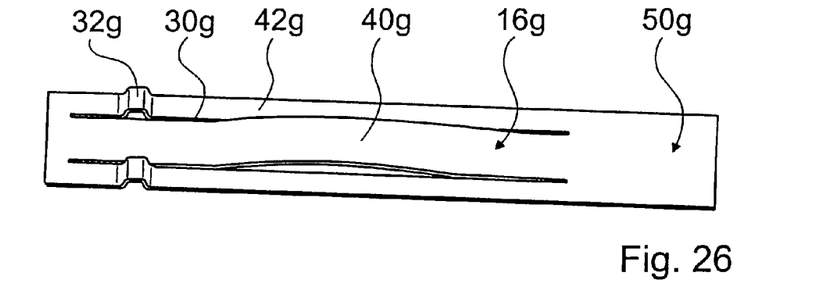

A simplified manufacturing and assembly process and increased stability is offered by the exemplary embodiment depicted in FIGS. 23 and 24, in which a center section 40e is shortened by a crimp 32e as compared with the outer sections 42e so that said sections can tension under pressure into arcs, which are fixed in their positions by tensile stress in the center section 40e of the component 50e. The exemplary embodiment depicted in FIGS. 25 and 26 uses the sample principle of shortening two outer sections 42g of a component 50g using crimps 32g, thereby tensioning a center section 40g into an arc.

Figure 21:
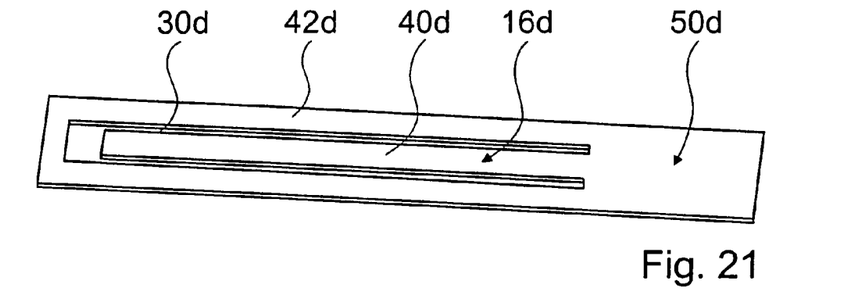
Figure 22:
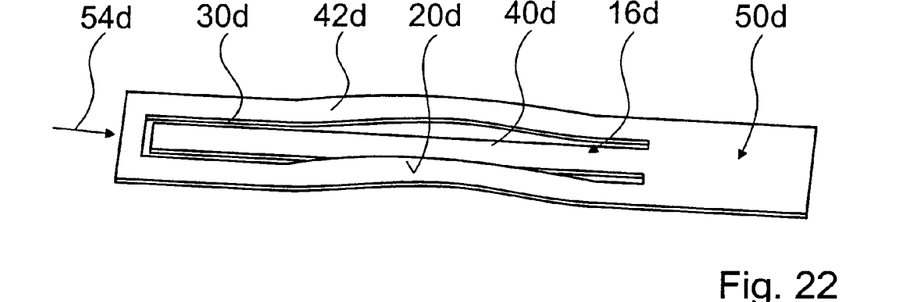
Figure 27:
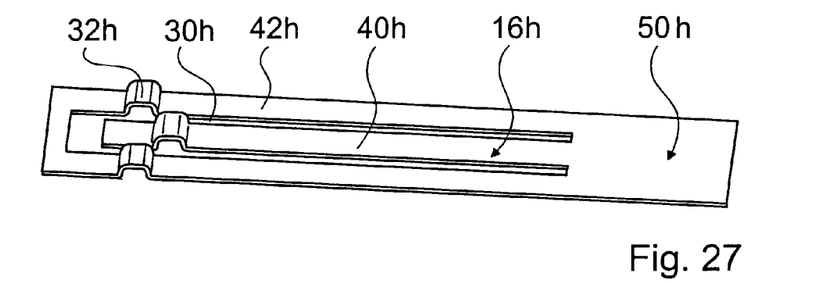
Figure 28:
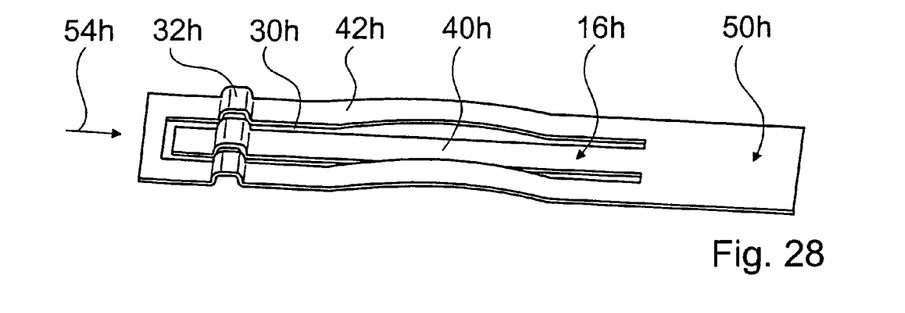
Figure 29:
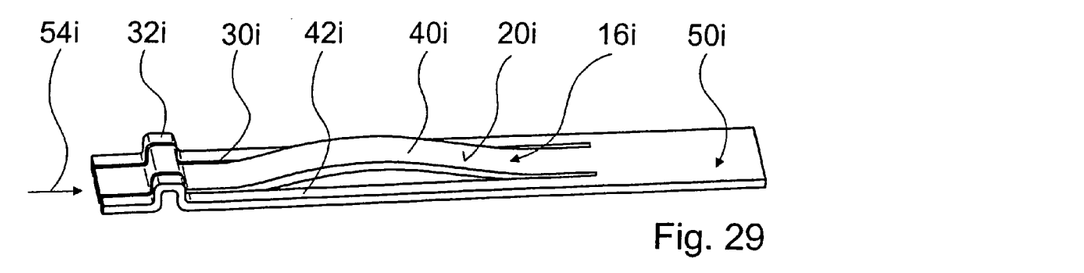
Figure 30:
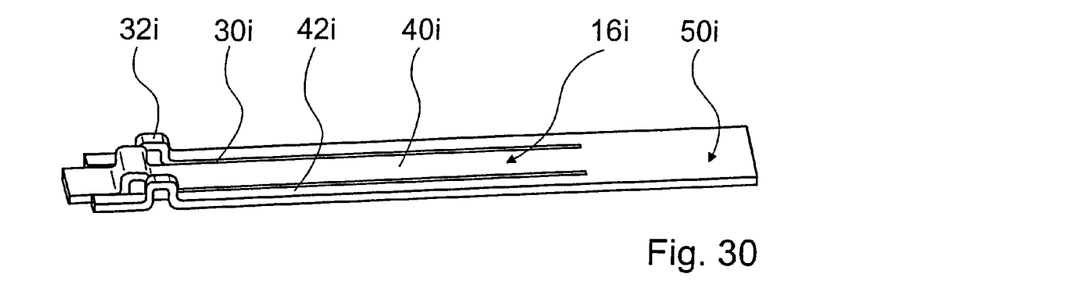

Derived from the exemplary embodiment in FIGS. 21 and 22 is the exemplary embodiment depicted in FIGS. 27 and 28, in which crimps 32h in three sections 40h, 42h of a component 50h represent three sections of a groove, which supports the fixation of a configuration with initially tensioned sections 42h. In the configuration depicted in FIG. 28, said configuration can be fixed by the insertion of a spring in the groove formed by the crimps 32h. An analogous embodiment for fixing an arched, initially tensioned center section 40i is depicted in FIGS. 29 and 30.

Figure 31:
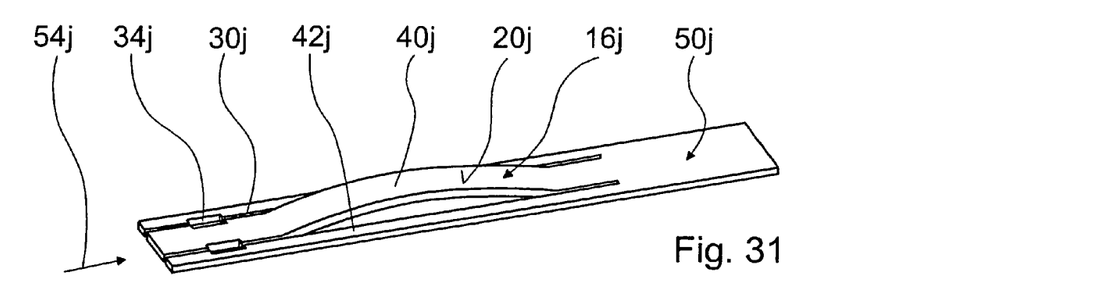
Figure 32:
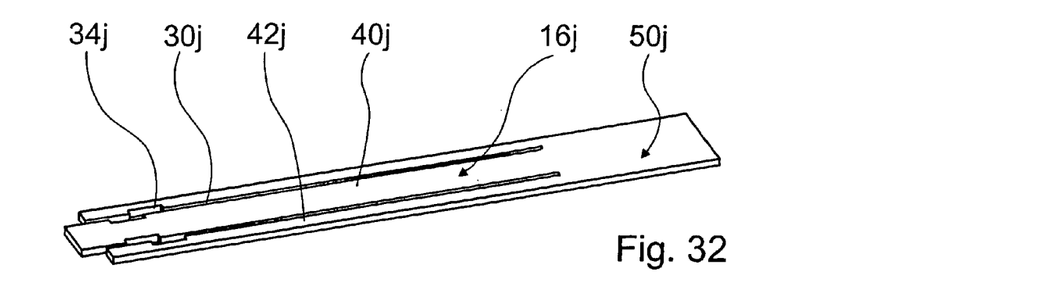

Another possibility for fixing an arched, initially tensioned center section 40j is depicted in FIGS. 31 and 32. Both the center section 40j, as well as two outer sections 42j have lateral recesses 34j, which in the initially tensioned configuration depicted in FIG. 31 complete a rectangular hole, through which fixing pins are inserted during mounting in a wiper arm, which pins prevent the component 50j from automatically reverting to a relaxed configuration, as depicted in FIG. 32.

FIGS. 33-37 show "snapshots" of a process, in which another alternative wiper arm 10k depicted in a longitudinal section and having limit stops 24k and 26k, which are formed on the fixing element 14k, is shifted from an operating configuration to a first stable configuration and back.

Figure 33:
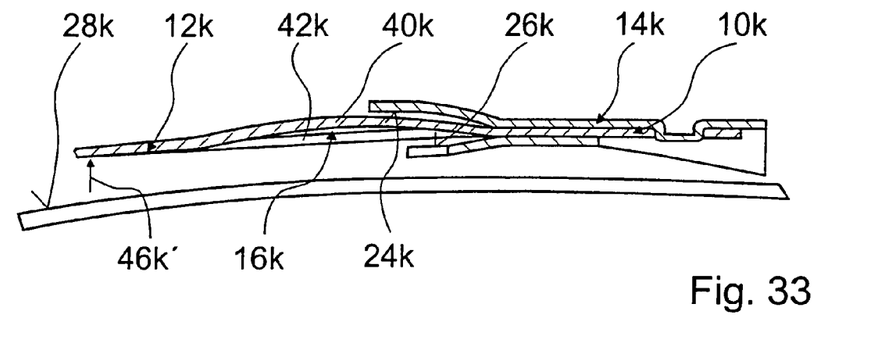
Figure 37:
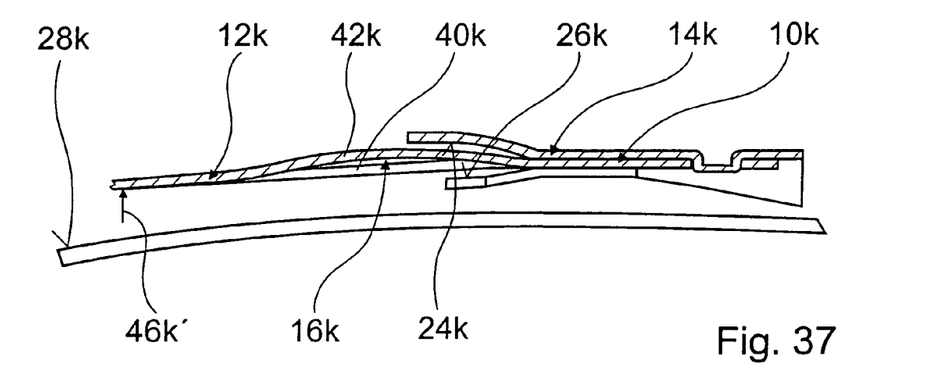
Figure 38:
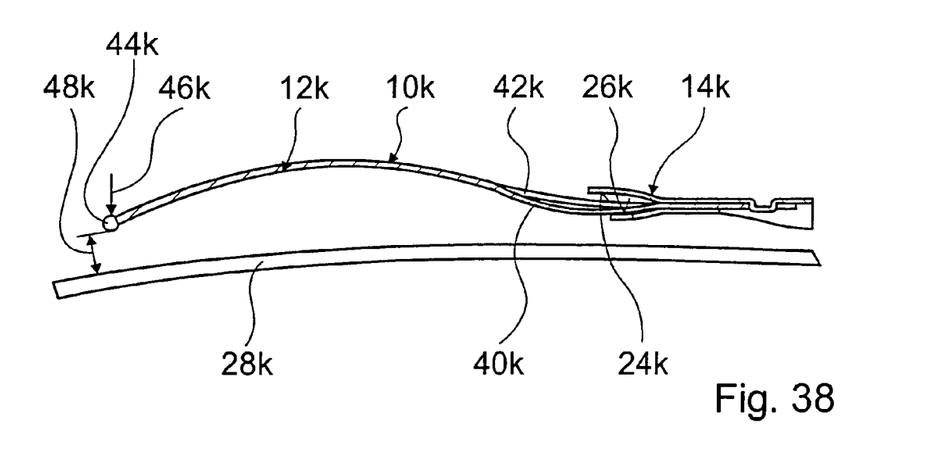

A spring elastic partial zone 16k with an initially tensioned center section 40k is formed as one piece on a wiper rod 12k. A force 46k, 46k' acts on a free end 44k of the wiper rod 12k during the process (FIG. 38). In this connection, it is a counter force 46k' compensating for a bearing force in the operating configuration (FIGS. 33 and 37).

Figure 34:
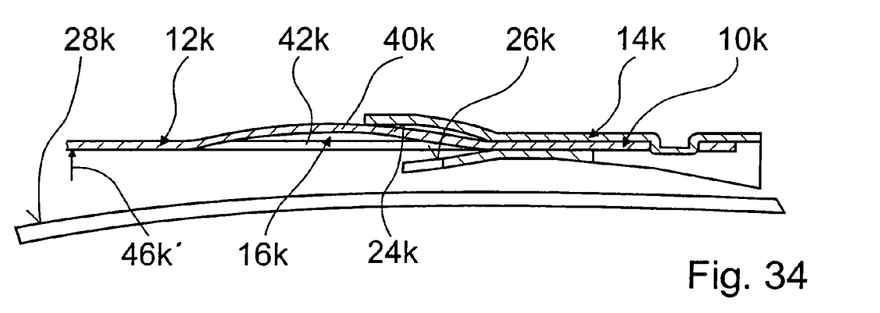
Figure 35:
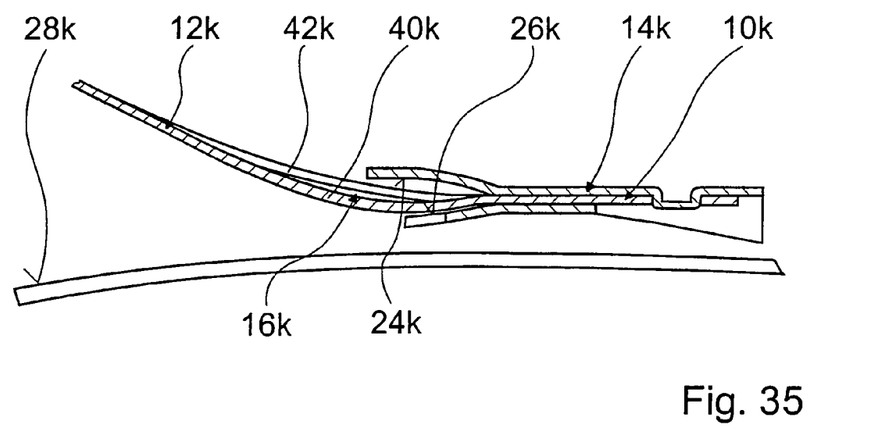
Figure 36:
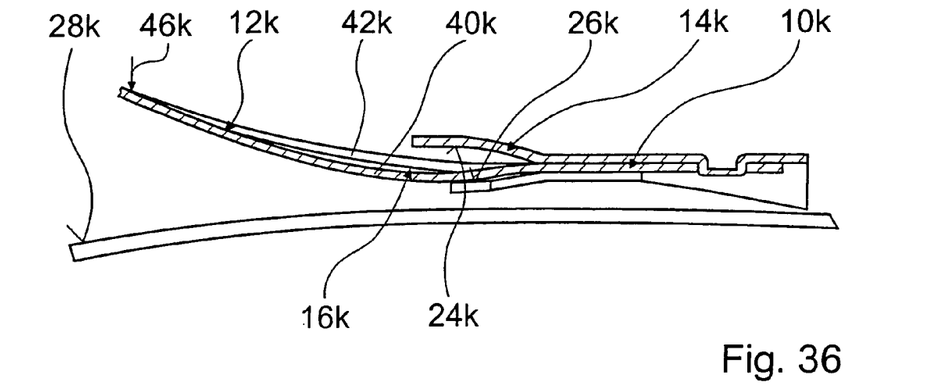

FIGS. 34 and 36 depict transition configurations, during which the forces 46k' and 46k acting on the free end 44k of the wiper rod 12k, act in the direction or counter direction of a vehicle window 28k. The forces 46k' and 46k are initiated each at a point on an arched center section 40k of the spring elastic partial zone 16k by means of the limit stops 24k and 26k. The limit stops 24k and 26k effectively and directly produces a change in the configuration of the wiper arm. Upending the center section 40k occurs suddenly as soon as the wiper arm 10k, when shifting of the wiper arm 10k from a first stable configuration (FIG. 35) to an operating configuration (FIGS. 33 and 37), has passed through a specific configuration depicted in FIG. 38, in which the free end 44k of the wiper arm 10k has a specific distance 48k from the limit stop 26k to the vehicle window 28k. A wiper blade can be advantageously mounted and dismounted in the stable configuration shown in FIG. 35 when the wiper arm 10k is in a mounted state.

Figure 39:
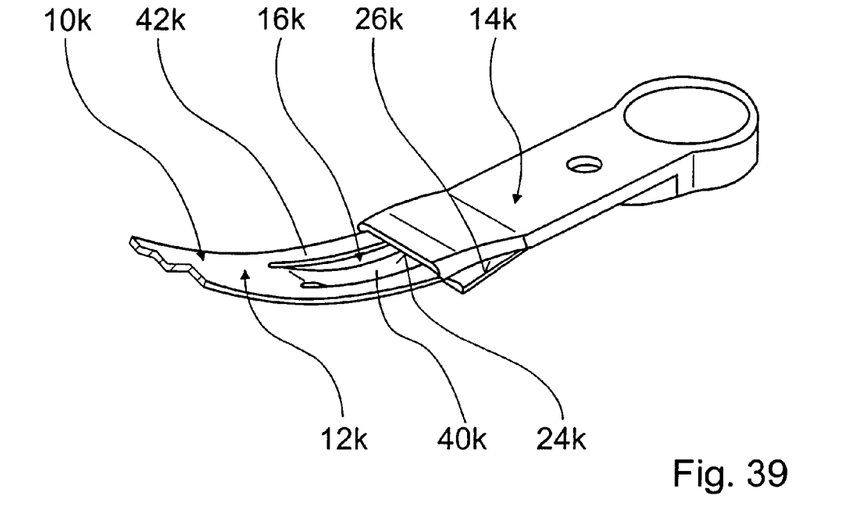
Figure 40:
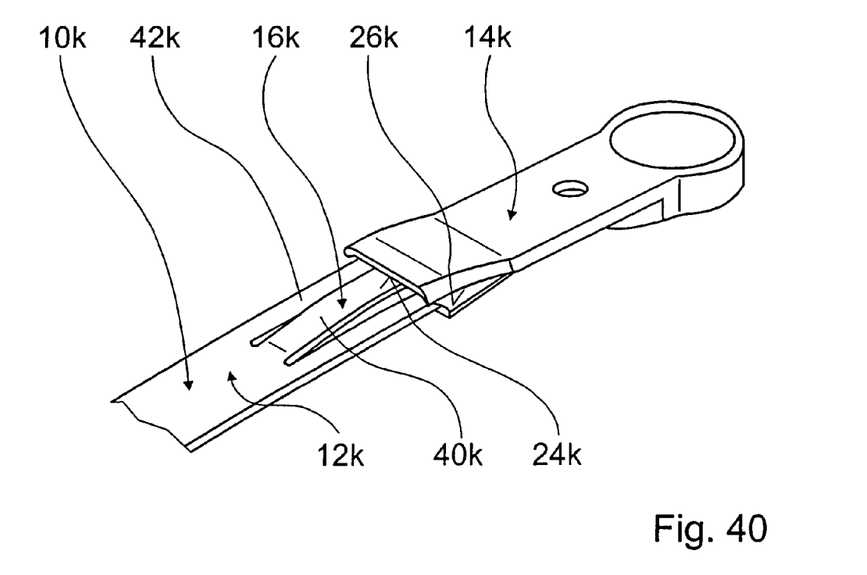

FIGS. 39 and 40 show a section of the wiper arm 10k from FIGS. 33-37 in spatial representations. Both the fixing element 14k, as well as the wiper rod 12k are designed as punched bent sheet metal parts, whereby the lower limit stop 26k and the upper limit stop 24k are formed on separate, riveted-together components of the fixing element 14k.

Figure 41:
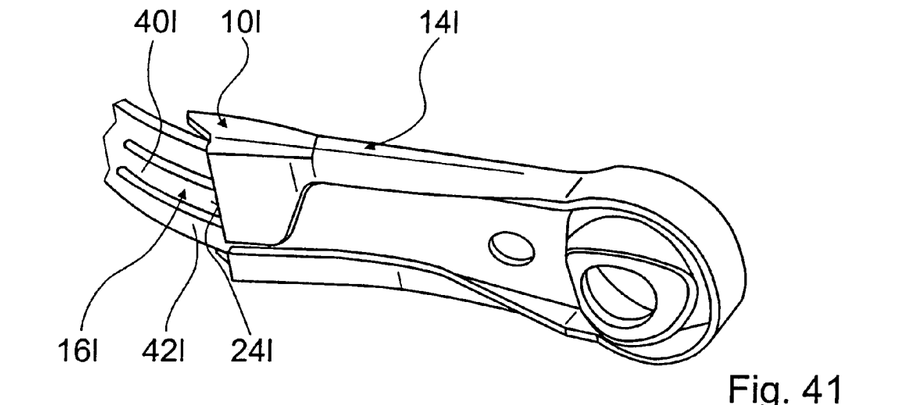
Figure 42:
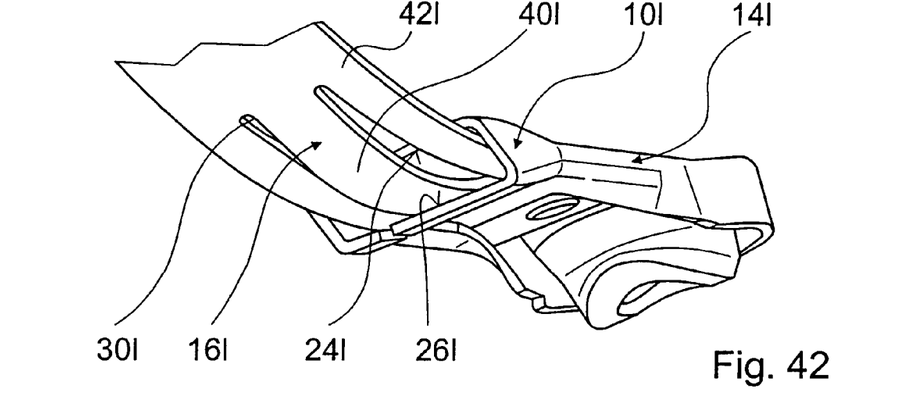
Figure 43:
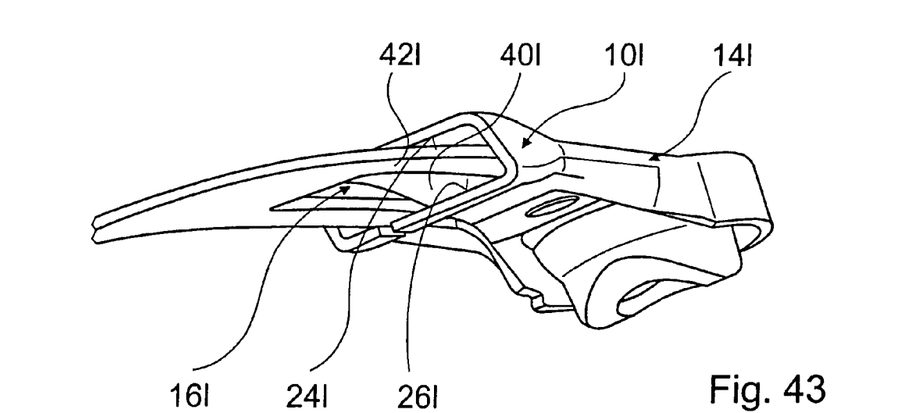

FIGS. 41-43 show a section of another alternative wiper arm 10l in spatial representations in two configurations. A fixing element 14l of the wiper arm 10l features limit stops 26l and 24l, which are formed as one piece from the sheet metal of the fixing element 14l. The lower limit stop 26l is realized by crimped-over flaps of the fixing element 14l.

The invention claimed is:

1. Wiper device, comprising a wiper arm (10a-10c, 10k, 10l), including:
    a wiper rod (12a, 12c, 12k) for fixing a wiper blade;
    a fixing element (14a-14c, 14k, 14l) connected free of articulation to the wiper rod (12a, 12c, 12k);
    and at least one partial zone (16a-16m) having spring elasticity; wherein the wiper arm (10a-10c, 10k, 10l) can shift essentially elastically from an operating configuration to at least one first stable configuration, the partial zone including a bistable component (50c-50j, 50m) which comprises at least three elongated sections (40c-40m, 42c, 42f-42m), wherein the wiper blade can be mounted and dismounted when the wiper arm (10a-10c, 10k, 10l) is in a mounted state and wherein the bistable component (50c-50j, 50m) is manufactured by tensioning at least one of the three elongated sections (40c-40m, 42c, 42f-42m).

2. Wiper device according to claim 1, characterized in that, the wiper arm (10a-10c, 10k, 10l) in a demounted state features a second stable configuration varying from the first stable configuration, into which the wiper arm (10a-10c, 10k, 10l) can essentially be shifted in a spring elastic manner.

3. Wiper device according to claim 2, characterized in that, the configurations occurring when shifting the wiper arm (10a-10c, 10k, 10l) from the first into the second stable configuration include the operating configuration.

4. Wiper device according to claim 3, characterized in that, at least one section (40g, 40i-40m, 42d, 42f, 42h) of the spring elastic partial zone (16d, 16f-16m) is under initial tension in at least one stable configuration.

5. Wiper device according to claim 3, characterized by, at least one limit stop (24k, 24l, 26k, 26l), via which a force can be initiated in a targeted manner in the area of the spring elastic partial zone (16k, 26l) during a shifting process between the two configurations.

6. Wiper device according to claim 5, characterized in that, the limit stop (24k, 24l, 26k, 26l) is formed on the fixing element (14k, 14l).

7. Wiper device according to claim 1, characterized in that, at least one section (40g, 40i-40m, 42d, 42f, 42h) of the spring elastic partial zone (16d, 16f-16m) is under initial tension in at least one stable configuration.

8. Wiper device according to claim 1, characterized by, at least one limit stop (24k, 24l, 26k, 26l), via which a force can be initiated in a targeted manner in the area of the spring elastic partial zone (16k, 26l) during a shifting process between the two configurations.

9. Wiper device according to claim 8, characterized in that, the limit stop (24k, 24l, 26k, 26l) is formed on the fixing element (14k, 14l).

10. Wiper device according to claim 1, characterized in that, at least one part of the spring elastic partial zone (16k, 16l) is integrated into the wiper rod (12k) as one piece.

* * * * *